US012622448B2

(12) United States Patent
Shi et al.

(10) Patent No.: US 12,622,448 B2
(45) Date of Patent: May 12, 2026

(54) TASTE MODIFYING INGREDIENTS

(71) Applicant: Givaudan SA, Vernier (CH)

(72) Inventors: Feng Shi, Mason, OH (US); Yosuke Onuma, Cincinnati, OH (US); Yili Wang, Mason, OH (US); Uwe Kohrs, Almere (NL)

(73) Assignee: Givaudan SA, Vernier (CH)

( * ) Notice: Subject to any disclaimer, the term of this patent is extended or adjusted under 35 U.S.C. 154(b) by 291 days.

(21) Appl. No.: 17/779,183

(22) PCT Filed: Dec. 11, 2020

(86) PCT No.: PCT/EP2020/085809
§ 371 (c)(1),
(2) Date: May 24, 2022

(87) PCT Pub. No.: WO2021/122384
PCT Pub. Date: Jun. 24, 2021

(65) Prior Publication Data

US 2023/0024978 A1 Jan. 26, 2023

Related U.S. Application Data

(60) Provisional application No. 62/948,918, filed on Dec. 17, 2019.

(51) Int. Cl.

| | |
|---|---|
| ***A23L 27/21*** | (2016.01) |
| ***A23C 9/13*** | (2006.01) |
| ***A23L 2/56*** | (2006.01) |
| ***A23L 27/00*** | (2016.01) |
| ***A23P 10/40*** | (2016.01) |

(52) U.S. Cl.
CPC .......... *A23L 27/215* (2016.08); *A23C 9/1307* (2013.01); *A23L 2/56* (2013.01); *A23L 27/88* (2016.08); *A23P 10/40* (2016.08); *A23V 2002/00* (2013.01)

(58) Field of Classification Search
CPC . A23L 2/56; A23L 27/88; A23L 27/84; A23L 33/10; A23L 13/428; A23L 27/00
USPC .................................................. 426/533, 534
See application file for complete search history.

(56) References Cited

U.S. PATENT DOCUMENTS

| | | | | |
|---|---|---|---|---|
| 4,022,920 | A * | 5/1977 | Doornbos | A23L 27/215 426/534 |
| 2005/0220964 | A1* | 10/2005 | Rizo | A23C 9/133 426/583 |
| 2017/0079316 | A1* | 3/2017 | Viton | A23L 2/56 |
| 2018/0055079 | A1 | 3/2018 | Smarrito-Menozzi et al. | |

FOREIGN PATENT DOCUMENTS

| | | | |
|---|---|---|---|
| CN | 101397313 | A | 4/2009 |
| CN | 101704850 | A | 5/2010 |
| CN | 101845363 | A | 5/2013 |
| CN | 106520368 | B | 3/2017 |
| CN | 107692299 | A | 2/2018 |
| CN | 109717428 | A | 5/2019 |
| JP | S4825508 | B1 | 7/1973 |
| JP | 2002194383 | A | 7/2002 |
| JP | 2012029615 | A | 2/2012 |
| JP | 2011072290 | A | 10/2012 |
| JP | 2011072289 | A | 3/2014 |
| JP | 2014057583 | A | 4/2014 |
| WO | 2005019165 | A1 | 3/2005 |

OTHER PUBLICATIONS

International Search Report for App. No. PCT/EP2020/085809 dated Apr. 12, 2021.
Written Opinion for App. No. PCT/EP2020/085809 dated Apr. 12, 2021.
Great Britain Search Report for App. No. 2001100.3 dated Jul. 16, 2020.
Frank D. Mills, et al., Amadori compounds as nonvolatile flavor precursors in processed foods, Journal of Agricultural and Food Chemistry, pp. 723-727, Jul. 1, 1969, vol. 17, Issue 4, American Chemical Society.

* cited by examiner

*Primary Examiner* — Hong T Yoo
(74) *Attorney, Agent, or Firm* — Curatolo Sidoti & Trillis Co., LPA; Salvatore A. Sidoti; Floyd Trillis, III

(57) ABSTRACT

A method of providing improved mouthfeel in consumables having a fat content of about 20% or less is provided. The method includes the step of adding to a consumable composition base from about 0.02 parts per billion to about 25 parts per million based on the total weight of the consumable composition of an Amadori compound, without any subsequent heating. The Amadori compound is a reaction product of glucose with proline.

10 Claims, No Drawings

TASTE MODIFYING INGREDIENTS

CROSS REFERENCE TO RELATED APPLICATIONS

This application is a national stage application of International Application No. PCT/EP2020/085809, filed 11 Dec. 2020, which claims the benefit of the filing date from U.S. Patent Application Ser. No. 62/948,918, filed 17 Dec. 2019, both of which applications are incorporated herein by reference.

TECHNICAL FIELD

The present disclosure relates to methods for improving mouthfeel in consumables, using taste modifying ingredients. More particularly, the present disclosure relates to methods for improving mouthfeel in consumables containing fats or reduced fats, using Amadori compounds that are a reaction product of glucose and an amino acid, where the consumables are food and beverages. Even more particularly, the present disclosure relates to flavor compositions and consumables comprising the Amadori taste modifying ingredients and the uses of the Amadori taste modifying ingredients in consumables, for example to improve mouthfeel of consumables.

BACKGROUND

Compounds for modifying the taste of consumable products, that is, products taken orally either for ingestion or spitting out, such as foodstuffs, beverages, confectionery, oral care products and the like are widely used. They do not themselves add flavor to the consumable, but they provide desirable ancillary benefits, such as enhanced mouthfeel, or masking undesirable characteristics of other ingredients, such as the bitter aftertaste associated with some sweeteners used in place of sugar in dietary products. A desirable mouthfeel is often typified by smoothness (lack of roughness and abrasion) and creaminess.

There is a continuing need to provide taste modifying ingredients that complement flavors of consumables in which they are incorporated in, in order to accentuate flavors and mouthfeel of said compositions, rather than exert their own particular taste characteristics; and so lend themselves to a very broad spectrum of use across a wide range of food and beverage categories.

Accordingly, there is a demand to provide compounds for use in consumables containing fat or reduced fat which improve mouthfeel, while at the same time preserving or enhancing the desired organoleptic properties of such edible compositions.

SUMMARY

In one illustrative embodiment, a method of providing improved mouthfeel in consumables having a fat content of about 20% or less, comprises the step of adding to a consumable composition base from about 0.02 parts per billion to about 25 parts per million based on the total weight of the consumable composition of an Amadori compound, without any subsequent heating.

In another illustrative embodiment, a consumable composition comprises a consumable base having a fat content of about 20% or less, and from about 0 02 parts per billion to about 25 parts per million based on the total weight of the consumable composition of an Amadori compound.

In another illustrative embodiment, a dairy consumable composition comprises a consumable base and from about 0.02 parts per billion to about 25 parts per million based on the total weight of the consumable composition of an Amadori compound, wherein the Amadori compound complements the mouthfeel characteristics of the consumable composition.

These and other features, aspects and advantages of specific embodiments will become evident to those skilled in the art from a reading of the present disclosure.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this application, which would still fall within the scope of the claims. All publications and patents cited herein are incorporated herein by reference.

An undesirable mouthfeel can be seriously disadvantageous to an otherwise desirably-flavored fat containing or reduced fat consumable. As used herein, "mouthfeel" refers to physical sensations in the mouth produced by a food, beverage or ingredient, including, but not limited to, heaviness, thickness, viscosity, wetness, smoothness, filminess, dryness, and mouth coating. Unfortunately, the desirable effect is often a feature of fatty foods, such as dairy products, the intake of which should be reduced for many people for health and dietary reasons.

It has now been unexpectedly discovered that undesirable mouthfeel properties can be improved by incorporating an Amadori compound into a consumable composition, wherein the Amadori compound is present in an amount from about 0.02 part per billion to about 25 parts per million based on the total weight of the consumable composition.

In one embodiment, disclosed is a method of providing improved mouthfeel in consumables having a fat content of about 20% or less, which comprises the step of adding to the consumable composition base from about 0.02 parts per billion to about 25 parts per million based on the total weight of the consumable composition of an Amadori compound.

Surprisingly, it has been found that the inclusion of an Amadori reaction product of glucose with proline being present in a certain concentration improves the overall mouthfeel of consumables having a fat content of about 20% or less.

In another embodiment, it has been found that the inclusion of an Amadori reaction product of glucose with proline being present in a certain concentration improves the overall mouthfeel of consumables having a fat content of more than about 20%.

It has also been found that the Amadori reaction product of glucose with proline being present in a certain concentration also enhances other mouthfeel characteristics, such as creaminess, fattiness and body.

Amadori compounds (also known as Amadori products) are formed via the well-known Amadori rearrangement reaction whereby a aldose sugar is isomerized via an acid or base and then reacted with an amine to form the Amadori compound after rearrangement of a Schiff base intermediate (see M. Amadori, *Atti Accad. Naz. Lincei* 2(6), 337 (1925); The Merck Index ($14^{th}$ Edition), pg. ONR-3, (2006)). The reaction scheme below shows the reaction between a hexose sugar and ammonia to form an Amadori compound.

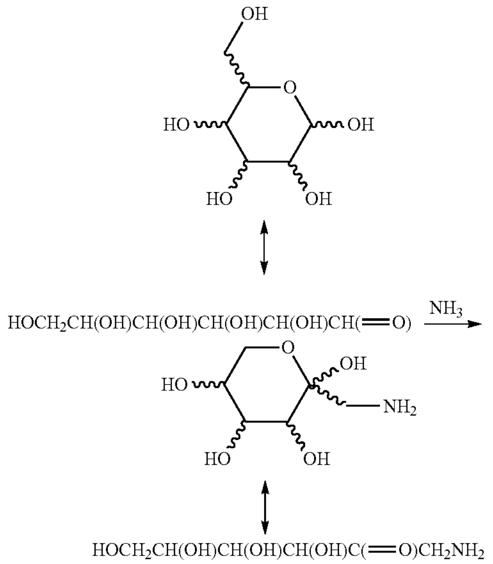

"Amadori compound"
from reaction of aldose (e.g. hexose)
sugar with ammonia

Although the method for making Amadori compounds (products) is well known in the art, their usage is less known in the art. Amadori compounds are considered not have benefits by themselves, but to function as intermediate compounds for the formation or advanced end products (AEPs) wherein the Amadori compound is under dehydration, fragmentation or aldol condensation. These AEPs often have benefit in the food industry as flavorants. One such example is the pyrolysis of Amadori compounds to produce compounds which have caramel odors. Mills et al., "Amadori Compounds as Nonvolatile Flavor Precursors in Processed Foods", *Agric. Food Chem*., vol. 17, no. 4. pgs 723-727 (July-August 1969).

According to certain embodiments, the Amadori compound is formed by the reaction of glucose with an amino acid wherein the amino acid is selected from the group consisting of histidine, isoleucine, methionine, proline and serine. In one embodiment, the Amadori compounds formed by the reaction of glucose and proline can be represented as N-(1-deoxy-D-fructose-1-yl)-L-proline:

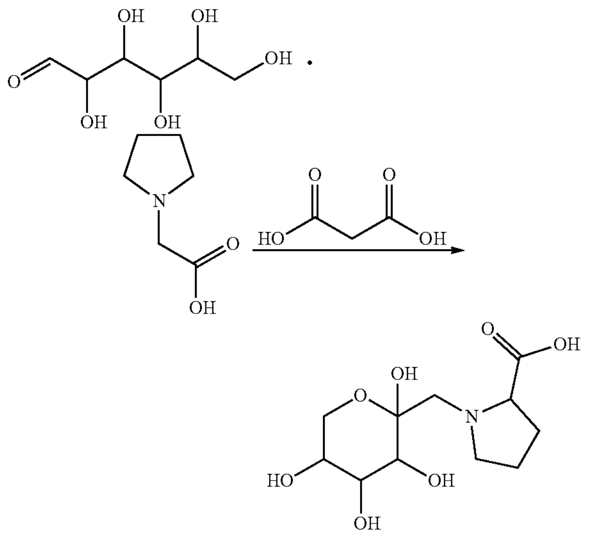

Similarly, the reaction of glucose with other naturally occurring amino acids can be represented as:

N-(1-deoxy-D-fructose-1-yl)-L-histidine;

N-(1-deoxy-D-fructose-1-yl)-L-isoleucine;

N-(1-deoxy-D-fructose-1-yl)-L-methionine;

In another embodiment, the Amadori compounds formed by the reaction of glucose and serine can be represented as N-(1-deoxy-D-fructose-1-yl)-L-serine:

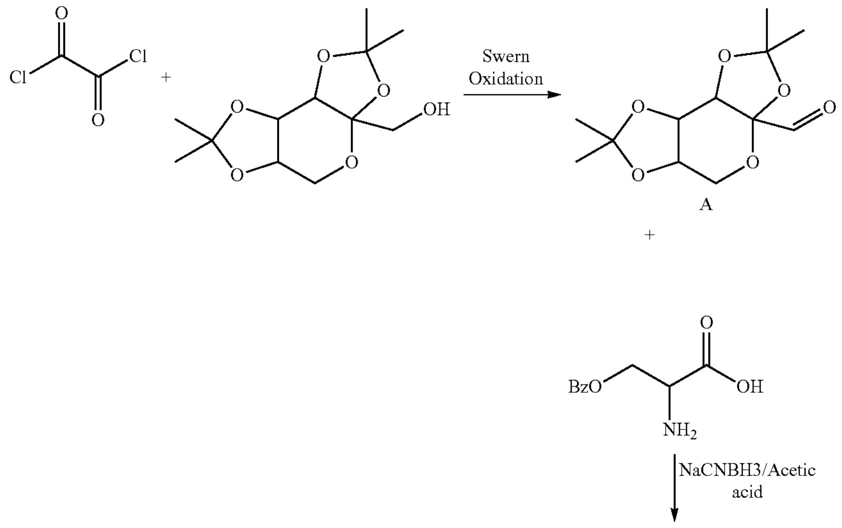

-continued

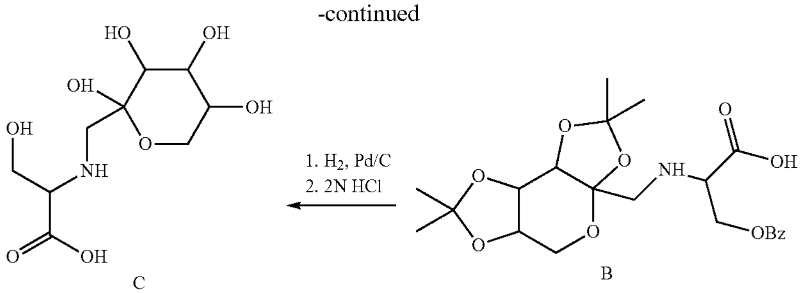

C B

The above structure of the Amadori compounds described in this application are also intended to encompass salt forms and charged forms thereof. In addition, although the above Amadori compound depicts a D-glucose. Amadori compounds from L-glucose are also considered to be part of the disclosure.

In order to obtain the remarkable beneficial effects attributed to the presence of the inclusion of an Amadori reaction product of glucose with proline, the reaction product should be employed in amounts of 0.02 parts per billion to 25 parts per million based on the total weight of the consumable composition. Whereas amounts higher than this can be employed, the beneficial effects are considerably less apparent and undesirable off-notes can become increasingly apparent.

According to certain embodiments, the amount of Amadori reaction product of glucose with proline present in the consumable composition may be in a concentration of from about 0.02 ppb to about 25 ppm. According to certain embodiments, the amount of Amadori reaction product of glucose with proline present in the consumable may be in a concentration of from about 0.1 ppb to about 10 ppm. According to certain embodiments, the amount of Amadori reaction product of glucose with proline present in the consumable may be in a concentration of from about 0.25 ppb to about 1 ppm. According to certain embodiments, the amount of Amadori reaction product of glucose with proline present in the consumable may be in a concentration of from about 0.5 ppb to about 250 ppb.

When expressed as "ppb" or "ppm", the concentration is parts per billion or parts per million by weight based on the total weight of the consumable, as the situation dictates. It should be understood that when a range of values is described in the present disclosure, it is intended that any and every value within the range, including the end points, is to be considered as having been disclosed. For example, "a range of from 100 ppm to 1000 ppm" of Amadori reaction product of glucose with proline is to be read as indicating each and every possible number along the continuum between 100 and 1000. It is to be understood that the inventors appreciate and understand that any and all values within the range are to be considered to have been specified, and that the inventors have possession of the entire range and all the values within the range.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions or methods for each value, and determining the range of values that produce compositions or methods with the desired degree of effectiveness in accordance with the present disclosure.

The articles "a," "an," and "the" are used herein to refer to one or to more than one (that is, at least one) of the grammatical object of the article. By way of example, "a compound" means one compound or more than one compound.

The final form of the taste modifying ingredient may be chosen according to methods well known in the art and will depend on the particular food application. For liquid foods, the taste modifying ingredient can be used without further processing in its liquid form. For dry applications, the spray-dried concentrated taste modifying ingredient can be used. The taste modifying ingredient may be directly added to food products, or may be provided as part of a flavor composition for flavoring or seasoning food products.

The consumable composition may include a base. As used herein, the term "base" refers to all the ingredients necessary for the consumable, apart from the taste modifying Amadori reaction product of glucose with proline. These will naturally vary in both nature and proportion, depending on the nature and use of the consumable or additive, but they are all well known to the art and may be used art-recognized proportions. The formulation of such a base for every conceivable purpose is therefore within the ordinary skill of the art.

Without limitation, and only by way of illustration, suitable bases may include, anti-caking agents, anti-foaming agents, anti-oxidants, binders, colourants, diluents, disintegrants, emulsifiers, encapsulating agents or formulations, enzymes, fats, flavour-enhancers, flavoring agents, gums, polysaccharides, preservatives, proteins, solubilisers, solvents, stabilisers, sugar-derivatives, surfactants, sweetening agents, vitamins, waxes, and the like. Solvents which may be used are known to those skilled in the art and include e.g. water, ethanol, ethylene glycol, propylene glycol, glycerine and triacetin. Encapsulants and gums include maltodextrin, gum arabic, alginates, gelatine, modified starch, other polysaccharides, and proteins.

Examples of excipients, carriers, diluents or solvents for flavor compounds may be found e.g. in "Perfume and Flavour Materials of Natural Origin", S. Arctander, Ed., Elizabeth, N.J., 1960, in "Perfume and Flavour Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

According to certain embodiments, Amadori reaction product of glucose with proline may be added to a consumable as part of a taste modifying composition, wherein the composition comprises at least one characterizing flavor. Amadori reaction product of glucose with proline may be added directly to a consumable or pre-mixed with certain ingredients of the consumable. Non-limiting examples of suitable characterizing flavors include natural flavors, artificial flavors, spices, seasonings, and the like. These include synthetic flavor oils and flavoring aromatics and/or oils, oleoresins, essences, and distillates, and combinations thereof. The term "characterizing flavor" refers to a flavor that is perceived by an individual to be predominant upon consumption by the individual.

Flavor oils include spearmint oil, cinnamon oil, oil of wintergreen (methyl salicylate), peppermint oil, Japanese mint oil, clove oil, bay oil, anise oil, *eucalyptus* oil, thyme oil, cedar leaf oil, oil of nutmeg, allspice, oil of sage, mace, oil of bitter almonds, and *cassia* oil; useful flavoring agents include artificial, natural and synthetic fruit flavors such as vanilla, and citrus oils including lemon, orange, lime, grapefruit, yuzu, sudachi, and fruit essences including apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, *papaya*, and so forth.

Additional exemplary flavors imparted by a characterizing flavor may include a milk flavor, a butter flavor, a cheese flavor, a cream flavor, and a yogurt flavor, a vanilla flavor, tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an *angelica* flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a *sassafras* flavor, a savory flavor, a Zanthoxyli Fructus flavor, a *perilla* flavor, a juniper berry flavor, a ginger flavor, a star anise flavor, a horseradish flavor, a thyme flavor, a tarragon flavor, a dill flavor, a *capsicum* flavor, a nutmeg flavor, a basil flavor, a marjoram flavor, a rosemary flavor, a bayleaf flavor, and a wasabi (Japanese horseradish) flavor; a nut flavor such as an almond flavor, a hazelnut flavor, a macadamia nut flavor, a peanut flavor, a pecan flavor, a pistachio flavor, and a walnut flavor; floral flavors; and vegetable flavors, such as an onion flavor, a garlic flavor, a cabbage flavor, a carrot flavor, a celery flavor, mushroom flavor, and a tomato flavor.

Generally any characterizing flavor or food additive such as those described in "Chemicals Used in Food Processing", Publication No 1274, pages 63-258, by the National Academy of Sciences, can be used.

Ancillary ingredients may be present to provide other benefits such as enhanced stability, ease of incorporation into a consumable or additive and enhanced nutritional value. Non-limiting typical examples of such ancillary ingredients include stabilizers, emulsifiers, preservatives, gums, starches, dextrins, vitamins and minerals, functional ingredients, salts, antioxidants, and polyunsaturated fatty acids. Particular examples are emulsifiers and carriers, useful in spray drying processes. Non-limiting examples of these are modified starches, such as Capsul™, and maltodextrin.

The additive may be a single ingredient or a blend of ingredients, or it may be encapsulated in any suitable encapsulant, such as those mentioned above. The additive may be prepared by any suitable method, such as spray drying, extrusion and fluidized bed drying.

Amadori reaction products may be used in a wide variety of consumables or applications and is not restricted to any particular physical mode or product form. According to the present disclosure, the term "consumable" refers to products for consumption by a subject, typically via the oral cavity (although consumption may occur via non-oral means such as inhalation), for at least one of the purposes of enjoyment, nourishment, or health and wellness benefits. Consumables may be present in any form including, but not limited to, liquids, solids, semi-solids, tablets, capsules, lozenges, strips, powders, gels, gums, pastes, slurries, solutions, suspensions, syrups, aerosols and sprays. The term also refers to, for example, dietary and nutritional, and health and wellness supplements. Consumables include compositions that are placed within the oral cavity for a period of time before being discarded but not swallowed. It may be placed in the mouth before being consumed, or it may be held in the mouth for a period of time before being discarded. It has been found that, in conjunction with dairy products and reduced fat dairy products, mouthfeel-improving effects of Amadori reaction products are especially enhanced.

Broadly, consumables include, but are not limited to, comestibles of all kinds, confectionery products, baked products, sweet products, savoury products, fermented products, dairy products, non-dairy products, beverages, nutraceuticals and pharmaceuticals.

Non-limiting examples of consumables include: wet/liquid soups regardless of concentration or container, including frozen soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage), soup may be used as an ingredient for preparing other meal components and may range from broths (consomme) to sauces (cream or cheese-based soups); dehydrated and culinary foods, including cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen; beverages, including beverage mixes and concentrates, including but not limited to, alcoholic and non-alcoholic ready to drink and dry powdered beverages, carbonated and non-carbonated beverages, e.g., sodas, fruit or vegetable juices, alcoholic and non-alcoholic beverages, teas such as green tea and black tea, wine such as red wine; confectionery products, e.g., cakes, cookies, pies, candies, chewing gums, gelatins, ice creams, sorbets, puddings, jams, jellies, salad dressings, and other condiments, cereal, and other breakfast foods, canned fruits and fruit sauces and the like.

According to certain embodiments, the Amadori reaction product of glucose with an amino acid is used to improve mouthfeel of reduced fat dairy products, such as milk or yoghurt. According to certain embodiments, the Amadori reaction product of glucose with proline is used to improve mouthfeel of reduced fat dairy products, such as milk or yoghurt.

Exemplary dairy products include, but are not limited to, cheese, cheese sauces, cheese-based products, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavoured, functional and other condensed milk, flavoured milk drinks, dairy only flavoured milk drinks, flavoured milk drinks with fruit juice, soy milk, sour milk drinks, fermented dairy drinks, coffee whiteners, powder milk, flavoured powder milk drinks, cream, yoghurt, plain/natural yoghurt, flavoured yoghurt, fruited yoghurt, probiotic yoghurt, drinking yoghurt, regular drinking yoghurt, probiotic drinking yoghurt, chilled and shelf-stable desserts, dairy-based desserts, and soy-based desserts.

A problem with reducing fat in dairy products is the loss in taste and texture. As the fat content in dairy products is reduced or replaced with other ingredients (e.g., non-digestible fat, protein, fiber, gums), adverse organoleptic effects (e.g., mouth coating, drying, lack of crispness and lack of flavour) are increased. The adverse organoleptic effects result in products having reduced palatability. According to the present disclosure, dairy products have a fat content of about 40% or less by weight based on the total weight of the consumable, more particularly about 20% or less, still more particularly 15% or less, in yet another embodiment 10% or less, and in yet another embodiment 5% or less.

EXAMPLES

The following examples are given solely for the purpose of illustration and are not to be construed as limitations of the present invention, as many variations of the invention are possible without departing from the spirit and scope of the present disclosure.

Example 1

In this example, an Amadori compound from the reaction of glucose with proline was prepared N-(1-deoxy-D-fructose-1-yl)-L-proline (Fru-Pro).

A mixture of 5 g of sugar (27.8 mmol) and 5 g of proline (38.1 mmol) was added to a solution of 1:1 MeOH:DMF (100 ml:100 ml) at room temperature. The mixture was stirred at 85° C. for 3 hours. Then 1.15 g of malonic acid (11.05 mmol) was added to the mixture and the resultant mixture was heated at 90° C. for 2 hours until the color of the reaction is light brown. The light brown mixture was filtered to remove undissolved components and concentrated under vacuum to remove most of the solvent. The Amadori compound was precipitated out by addition of cold acetone at ~30° C. 4.14 g (92% pure) of white solid was obtained after centrifugation and C18 flash column purification.

Similarly, Fru-Met can be prepared as described above using methionine in place of proline; Fru-Ileu can be prepared as described above using isoleucine in place of proline; and Fru-His can be prepared as described above using histidine in place of proline.

NMR Data

Fru-Prn $^1$H NMR (300 MHz, $D_2O$) δ ppm 1.86-2.13 (m, 3H), 2.14-2.39 (m, 1H), 3.18-4.08 (m, 10H). $^{13}$C NMR (75 MHz, $D_2O$, major isomer) δ ppm 23.35, 28.27, 46.08, 57.36, 63.74, 68.90, 69.90, 69.97, 71.44, 95.64, 173.84.

Fru-Met $^1$H NMR (600 MHz, $D_2O$) δ ppm 2.09-2.16 (m, 1H), 2.18-2.30 (m, 2H), 2.58-2.74 (m, 1H), 3.28-3.44 (m, 1H), 3.74-3.81 (m, 1H), 3.81-3.94 (m, 1H), 3.98-4.08 (m, 1H).

$^{13}$C NMR (151 MHz, $D_2O$) δ ppm 16.95, 31.63, 31.90, 55.53, 62.28, 66.76, 71.78, 72.20, 72.76, 98.21, 175.78.

Fru-Ileu $^1$H NMR (300 MHz, $D_2O$) δ ppm 0.81-0.92 (m, 6H), 1.19-1.29 (m, 1H), 1.39-1.50 (m, 1H), 1.91 (br m, 1H), 3.20-3.22 (m, 2H), 3.56-3.95 (m, 6H).

$^{13}$C NMR (75 MHz, $D_2O$, major isomer) δ ppm 11.21, 14.07, 25.86, 25.99, 35.79, 52.35, 63.87, 67.76, 68.89, 69.34, 70.12, 95.26, 172.08.

Fru-His $^1$H NMR (600 MHz, $D_2O$) δ ppm 3.00-3.36 (m, 3H), 3.46-4.03 (m, 5H), 4.77-4.82 (m, 1H), 4.87-5.05 (m, 1H), 7.10-7.23 (m, 1H), 8.06 (s, 1H).

$^{13}$C NMR (151 MHz, $D_2O$) δ ppm 30.20, 55.45, 65.35, 65.86, 71.83, 72.31, 72.71, 98.96, 119.42, 134.29, 137.99, 178.04.

In another example, the Amadori compounds formed by the reaction of glucose and serine can be represented as N-(1-deoxy-D-fructose-1-yl)-L-serine (Fru-Ser):

Oxyalchloride (6.64 g, 52.3 mmol) in 200 ml of dichloromethane was cooled to −78° C. (acetone/dry ice), to this stir solution 12 ml (77 mmol) DMSO in 20 ml dichloromethane was added dropwise through pressurized dropping funnel. Upon completion, the mixture was stirred at −78° C. for 15 min, then acetyl protected sugar (20 g, 77 mmol) in 80 ml dichloromethane was added dropwise using pressurized dropping funnel again, the mixture was stirred at −78° C. for 17 min, then triethyl amine (53.6 ml, 77 mmol) was added dropwise through pressurized dropping funnel, continually stirred at −78° C. for 17 min, then the mixture was warmed up to room temperature, water was added, the mixture was extracted 3× with dichloromethane, the organic layers were combined, washed with 1N HCl 2×, 5% Na2CO3 2×, water 2×, and sat'd NaCl.

Dried with sodium sulfate, filter and filtrate was concentrated. Purified by flash chromatography using a silica gel column with EtOAc/Hexane gradient 5%, 10%, 15%, 20% EtOAc in Hexane to 100% EtOAc obtained 10 g of clear oil compound A. Use as is.

To a solution of A (2.55 g, 9.88 mmol) and Benzyl protected serine (1.76 g, 9.0 mmol) in 50 ml MeOH was added IM solution of sodium cyanoborohydride (10 ml, 9.0 mmol) at room temperature, the mixture was stirred at same temperature for 2 hours, rotovap off most of MeOH. To this mixture saturated NaCl was added, extracted 3× with EtOAc. The organic layers were combined, concentrated under vacuum and dried over sodium sulfate. Silica chromatography 5% MeOH in CH2Cl2 obtained 3 g of white solid of compound B.

Compound B: 1H NMR (300 MHz, CD3OD-d6, δ ppm) 1.32 (s, 3H), 1.36 (s, 3H), 1.42 (s, 3H), 1.53 (s, 3H), 3.35 (s, 2H), 3.44 (s, 2H), 3.72-3.76 (d, d, J=12.9, Hz, 1H), 3.87-4.06 (m, 4H), 4.25-4.27 (d, J=6.2 Hz, 1H), 4.314.32 (d, J=2.4 Hz, 1H), 4.58 (s, 2H), 4.63-4.66 (d, d, J=2.7, 8.1 Hz, 1H), 7.27-7.39 (m, 5H).

To a solution of B (3 g, 6.86 mmol) in Methanol (50 ml) at room temperature was added Pd/C, the solution was degassed and stirred at under hydrogen balloon for 4 days. The solid was filtered; the solvent was removed under vacuum. Silica chromatography 5% MeOH in CH2C12 obtained 1.15 g of white solid of compound B which was dissolved in 2N HCl (2 nil). The round bottom flask was placed on a rotary evaporator and the solution was concentrated at room temperature in vacuum (~30 mmHg). The resulting oily resi-due was dissolved in water and was concentrated in vacuum. This operation was re-peated two times to give crude Amadori serine compound C. This crude material was purified on C18 column to obtain 0.32 g white solid compound C.

Fru-Ser

1H NMR (300 MHz, $D_2O$) S ppm 3.20-3.37 (m, 2H), 3.63-4.00 (m, 8H).

13C NMR (75 MHz, $D_2O$, major isomer) δ ppm 52.39, 59.04, 63.89, 68.88, 69.33, 70.32, 95.26, 171.14.

The following formulations were prepared with and without Amadori compound and tasted by expert tasters (5-7) and compared. The Amadori compound was dosed in the consumable with no additional heating required.

Vanilla Flavored Milk

Base: Half full milk; 5% sugar, 0.1% vanillin; 20 ppm Fru-Pro: slightly fuller, richer than base, fuller like fat, sweeter.

Base: 2% milk fat: 4% sugar; 0.2% vanilla extract; 0.1 ppb Fru-Pro: sweeter linger, more powdery, more fatty body, full and creamy, more dairy impact, creamier mouthfeel, slight waxy mouthfeel.

Base: 2% milk fat: 4% sugar: 0.2% vanilla extract; 1 ppb Fru-Pro: sweeter, increase fullness, creamier mouthfeel, more dairy, slight waxy mouthfeel.

Base: 2% fat milk; 4% sugar; 0.15% vanilla flavor; δ ppm Fru-Pro: sweeter, more rich creamy, slightly sweeter, juicy, slight metallic and mouth drying.

Chocolate Flavored Milk

Base: 2% milk fat; 5% sugar; 2% cocoa powder, 0.05% carrageenan: 0.1 ppb Fru-Pro: creamy, full, richer chocolate, slight waxy, more cocoa impact.

Base: 2% milk fat; 5% sugar: 2% cocoa powder, 0.05% carrageenan; 1 ppb Fru-Pro: more chocolate linger, more chocolate, more complex, full mouthfeel, sweeter impression, thicker, waxy, slight tingle.

Base: 2% fat milk; 5% sugar; 20/cocoa powder; 0.05% carrageenan; 10 ppm Fru-Pro: more rich, more body, more real chocolate profile, slight increase in bitterness.

Almond Milk

Base: commercially available sweetened vanilla almond milk; 2 ppb Fru-Pro: more creamy, stronger vanilla flavor, more body, more creamy mouthfeel; sweeter and more salty.

Strawberry Flavored Yoghurt

Base: 1.7% fat; 4% sugar; strawberry flavor 0.1%; 1 ppb Fru-Pro: hardly any effect noticed.

Base: 1.7% fat; 4% sugar; strawberry flavor 0.1%; 10 ppb Fru-Pro: sweeter, more creamy, richer mouthfeel, more fruity.

Base: 1.7% fat; 4% sugar; strawberry flavor 0.1%; 100 ppb Fru-Pro: similar to 10 ppb.

Plain low fat Yoghurt

Base: 1.5% fat; 5% sugar; 5 ppm Fru-Pro: less sour, sweeter, creamy.

Base: 1.5% fat; 5% sugar; 10 ppm Fru-Pro: increase upfront sweet, less sour.

Base: 1.5% fat; 5% sugar; 25 ppm Fru-Pro: metallic linger, increase overall and upfront sweet.

Ice Cream

Base: 14.31% heavy whipping cream; 77.60% whole milk; 8% sucrose; 0.009% vanillin; 10 ppb Fru-Pro: more creamy, sweeter, slightly more body and mouth round effect, slightly more milk fat taste.

Cream Filling

Base: 66.4% sucrose; 32% palm oil; 0.2% salt; 0.4% vanilla extract; 1% water; 10 ppb Fru-Pro: more fatty and creamy, sweeter and more salty, more buttery profile.

Cheese Sauce

Base: 33.46% Maltodextrin 10DE; 29.00% Starch Ultrasphere 2000; 10.00% Cheddar Cheese (white); 9.00% non-fat milk powder; 6.20% Whey; 5.00% canola shortening powder; 4.25% salt, 40 mesh; 0.35% yeast extract powder; 0.10% citric acid; 0.10% lactic acid; 2.54% cheese flavor.

10 ppm Fru-Pro: denser, cheesier, smooth, saltier, creamier mouthfeel, fresher dairy note, rich, slight metallic and astringent.

10 ppm Fru-Met: more rich, cheesy, umami, astringent, sharper cheese notes, salty.

10 ppm Fru-Ser: cheesy, creamy, rich, tingling, metallic, thick, smooth.

10 ppm Fru-Ileu: slight acidic, bitter, creamier, increased saltiness.

10 ppm Fru-His: more cheesy, slight acidic, aged, meaty, tingling, chalky, increased mouthfeel, creamier.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumable composition comprising a consumable base and from about 0.02 parts per billion to about 25 parts per million based on the total weight of the consumable composition of an Amadori compound represented as N-(1-deoxy-D-fructose-1-yl)-L-proline, wherein the Amadori compound complements the mouthfeel characteristics of the consumable composition, wherein the consumable composition is a reduced fat yoghurt having a fat content of about 20% or less.

2. The consumable composition according to claim 1, wherein the amount of the Amadori compound in the consumable base is from about 0.1 parts per billion to 10 parts per million.

3. The consumable composition according to claim 1, wherein the fat content is about 10% or less.

4. The consumable composition according to claim 1, wherein the fat content is about 5% or less.

5. The consumable composition according to claim 1, wherein the Amadori compound is a powder.

6. The consumable composition according to claim 1, further comprising a characterizing flavor.

7. The consumable composition according to claim 1, wherein the amount of the Amadori compound in the consumable base is from about 0.02 parts per billion to less than 100 parts per billion.

8. The consumable composition according to claim 1, wherein the amount of the Amadori compound in the consumable base is from about 0.1 parts per billion to less than 0.1 part per million.

9. The consumable composition according to claim 1, wherein the amount of the Amadori compound in the consumable base is from about 0.25 parts per billion to less than 0.1 part per million.

10. The consumable composition according to claim 1, wherein the amount of the Amadori compound in the consumable base is from about 0.5 parts per billion to 100 parts per billion.

* * * * *